(12) United States Patent
Pancutt

(10) Patent No.: US 10,808,802 B2
(45) Date of Patent: Oct. 20, 2020

(54) IRREVERSIBLY LOCKING CLIP

(71) Applicant: Carl James Mark Pancutt, Hawthorne, CA (US)

(72) Inventor: Carl James Mark Pancutt, Hawthorne, CA (US)

( * ) Notice: Subject to any disclaimer, the term of this patent is extended or adjusted under 35 U.S.C. 154(b) by 34 days.

(21) Appl. No.: 16/112,101

(22) Filed: Aug. 24, 2018

(65) Prior Publication Data
US 2019/0063552 A1 Feb. 28, 2019

Related U.S. Application Data

(60) Provisional application No. 62/551,067, filed on Aug. 28, 2017.

(51) Int. Cl.
*F16G 15/02* (2006.01)
*F16B 45/02* (2006.01)
*F16G 15/04* (2006.01)

(52) U.S. Cl.
CPC .............. *F16G 15/02* (2013.01); *F16B 45/02* (2013.01); *F16G 15/04* (2013.01)

(58) Field of Classification Search
CPC ........ F16B 21/065; F16B 45/02; F16G 15/02; F16G 15/04
See application file for complete search history.

(56) References Cited

U.S. PATENT DOCUMENTS

| | | | | |
|---|---|---|---|---|
| 2,550,038 | A * | 4/1951 | Brown | F16G 15/04 59/85 |
| 4,811,467 | A * | 3/1989 | Lowe | F16B 45/02 24/592.1 |
| 5,210,914 | A * | 5/1993 | Katsma | F16B 45/02 24/588.1 |
| 7,047,604 | B2 * | 5/2006 | Axel | A01K 27/00 16/422 |
| 7,992,267 | B2 * | 8/2011 | Christianson | F16B 45/02 24/598.2 |
| 10,363,442 | B2 * | 7/2019 | Kekahuna | A62B 35/0068 |
| 10,384,086 | B2 * | 8/2019 | Kekahuna | A62B 35/0068 |
| 2004/0143945 | A1 * | 7/2004 | Christianson | F16B 45/02 24/600.1 |
| 2010/0011547 | A1 | 1/2010 | Schluep | |
| 2013/0036579 | A1 * | 2/2013 | Christianson | F16B 45/02 24/600.1 |
| 2017/0307004 | A1 * | 10/2017 | Cardella | F16B 45/02 |
| 2018/0345056 | A1 * | 12/2018 | Kekahuna | A63B 27/00 |
| 2019/0022437 | A1 * | 1/2019 | Kekahuna | A62B 35/0068 |

* cited by examiner

*Primary Examiner* — Robert Sandy
*Assistant Examiner* — David M Upchurch
(74) *Attorney, Agent, or Firm* — Steins & Associates, P.C.

(57) ABSTRACT

A Irreversibly Locking Clip. The clip has a hinged latch that pivots from an open position to a closed position, similar to a conventional caribiner. The clip provides the structural strength and durability of a caribiner or shackle. The clip includes one or more spring-loaded pins that will irreversibly lock the latch in a closed position by extending into a corresponding socket when the latch is closed. Additionally, the clip incorporates a retaining tip at the tip end of the latch that engages a tip retaining socket when the latch is closed in order to provide additional reinforcement between the latch and the body of the clip.

15 Claims, 8 Drawing Sheets

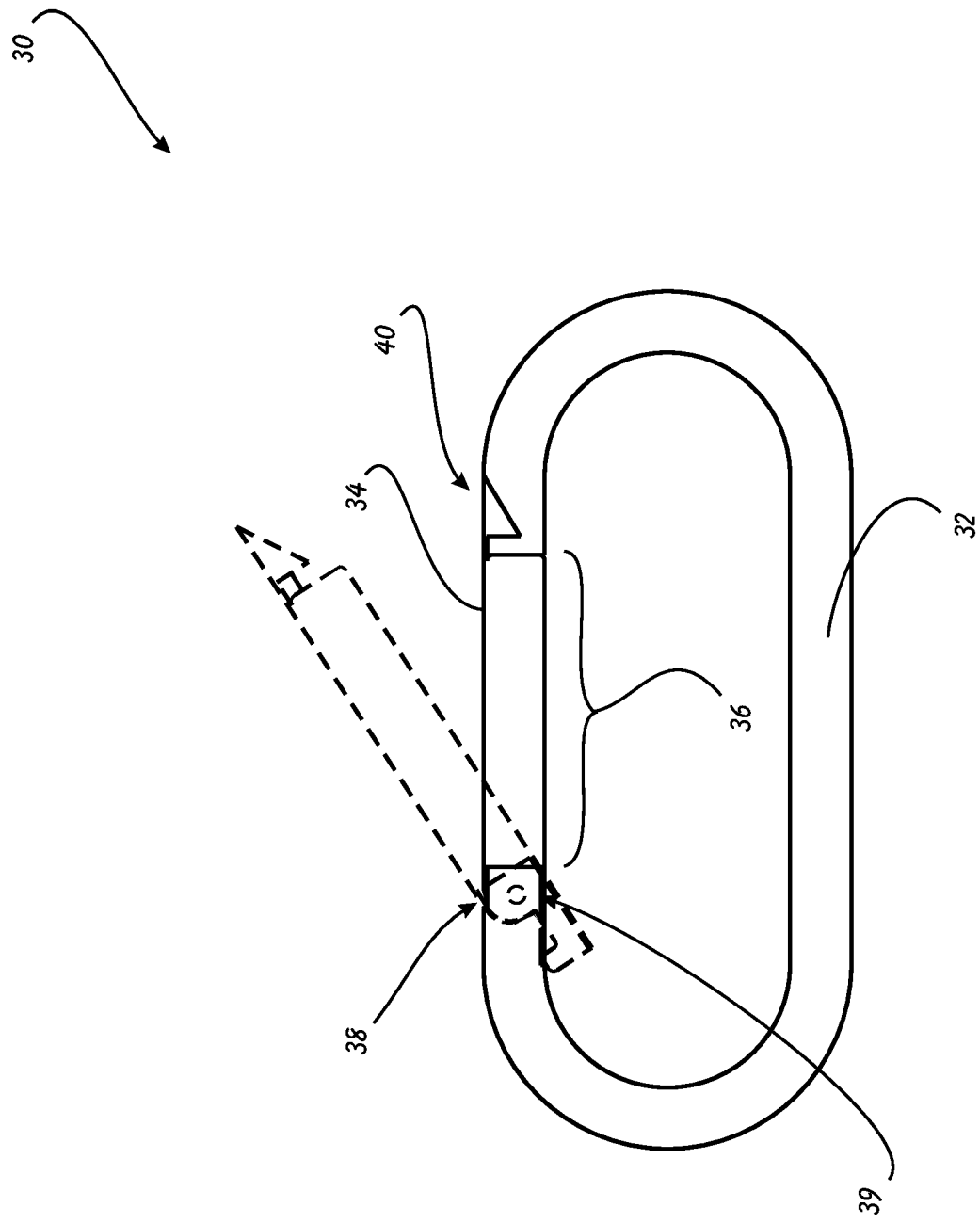

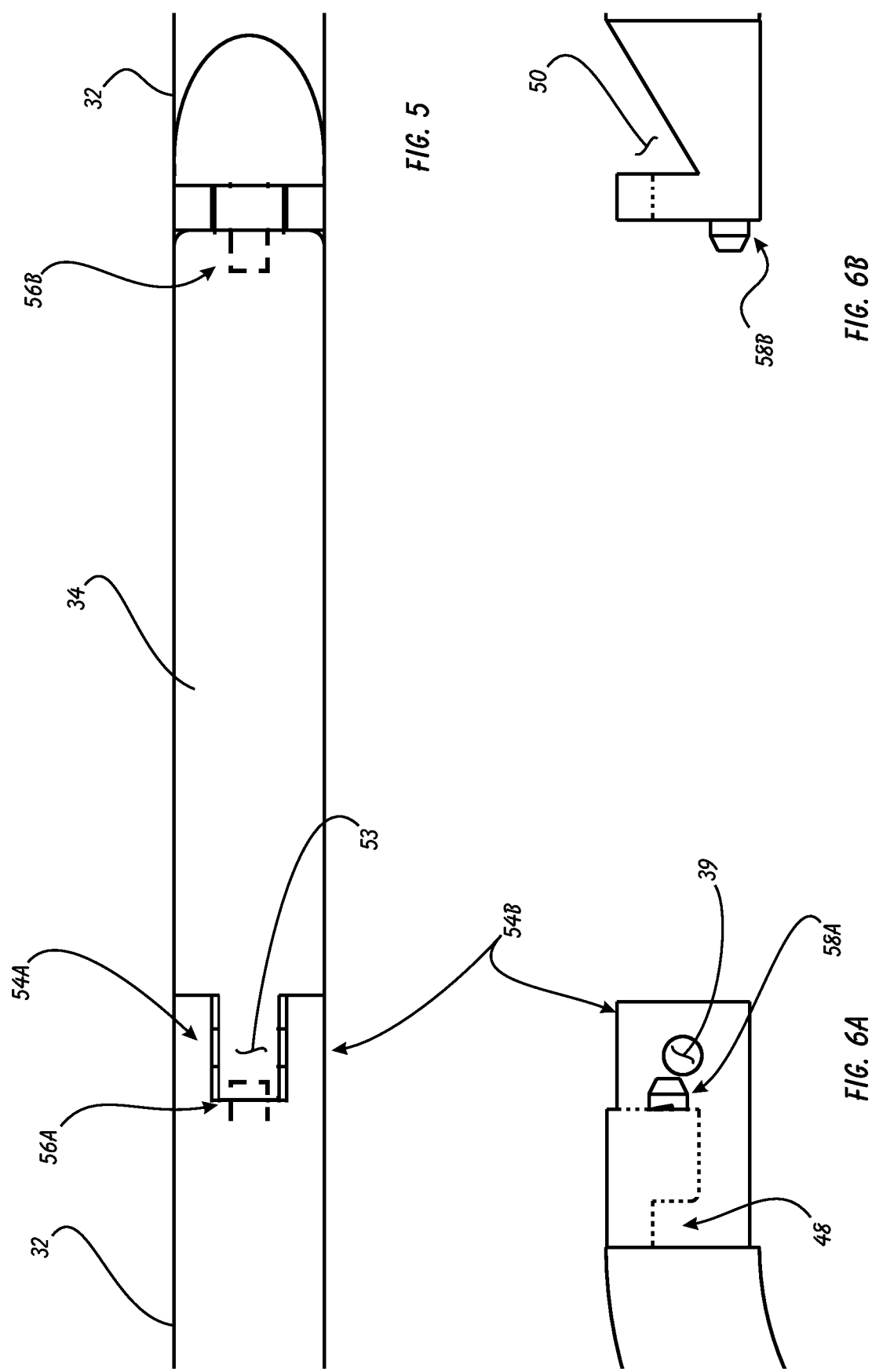

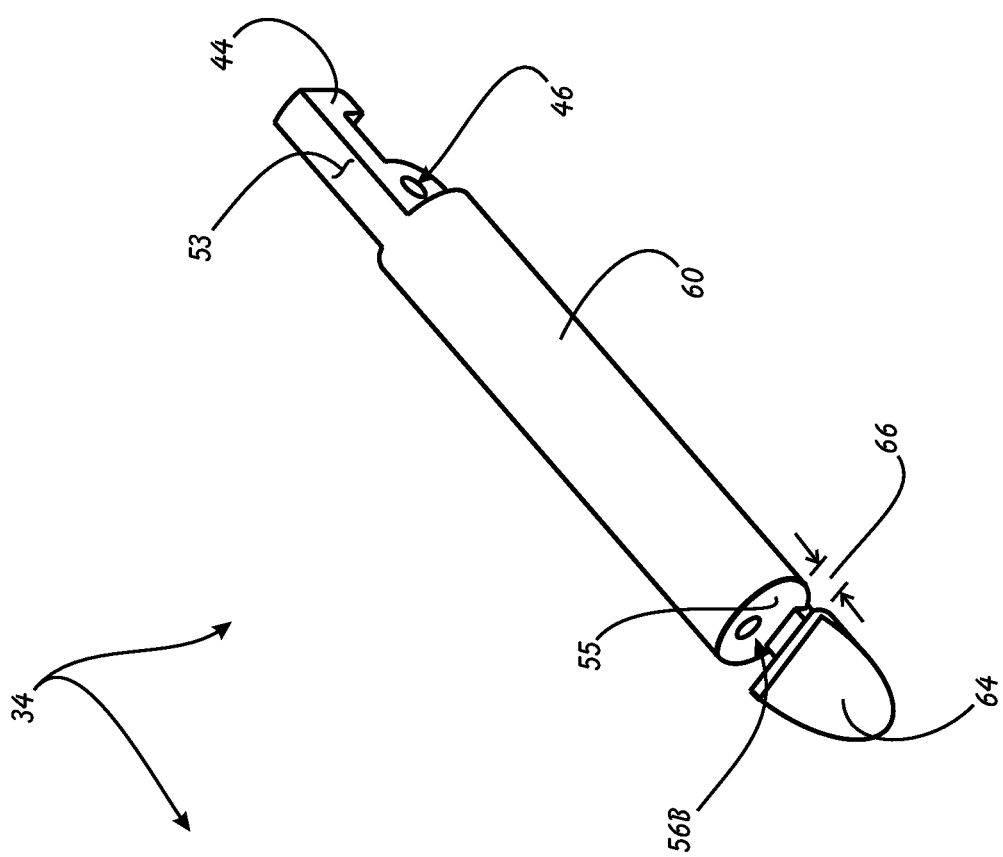
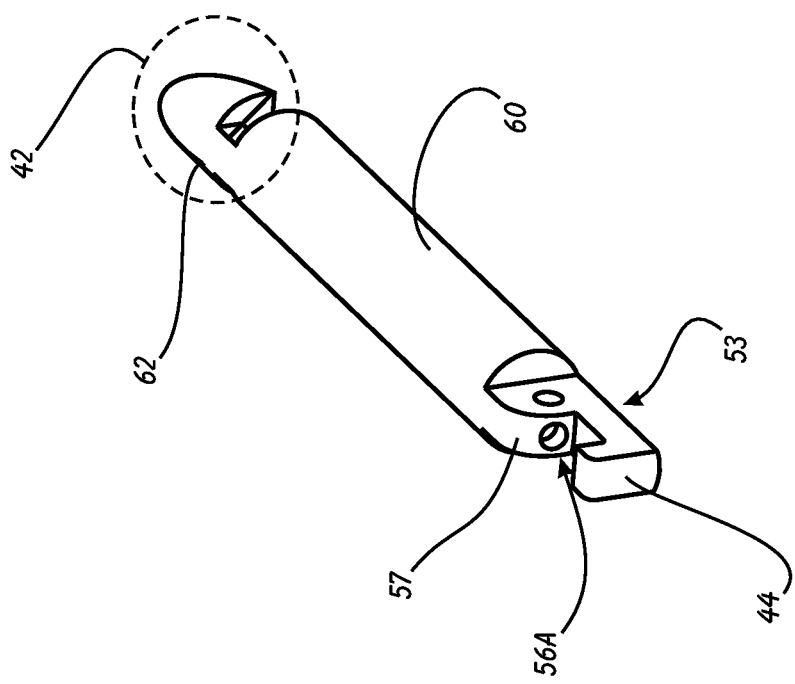
FIG. 7B
FIG. 7A

IRREVERSIBLY LOCKING CLIP

This application is filed within one year of, and claims priority to Provisional Application Ser. No. 62/551,067, filed Aug. 28, 2017.

BACKGROUND OF THE INVENTION

1. Field of the Invention

This invention relates generally to links, loops, connectors and clips and, more specifically, to an Irreversibly Locking Clip.

2. Description of Related Art

Threaded chain links are very common devices that are intended to provide the strength of a conventional chain link, while also being detachable from the chain or external structure. FIGS. 1 and 2 depict a version of a conventional threaded chain link that has been modified such that it is no longer detachable once it has been closed.

FIG. 1 is a side view and FIG. 2 is a cutaway end view of the "Irreversible Locking Mechanism" of Schluep, et al., U.S. Patent Application Publication No. 2010/0011547. The Schluep mechanism 10 appears, from the exterior, to be a conventional threaded chain link. There is a link-shaped body 12 that has a gap "G" in its opposing ends. The gap "G" can be closed by twisting the gate 14 so that it engages the exterior threads formed on the body 12 on the opposing ends thereof. Unlike a conventional threaded chain link, the Schluep locking mechanism has a spring 18 that drives a spring-loaded pin 16 into a catch 20 when the gate 14 has been threaded across to close the gap "G" until the pin 16 is aligned with the catch 20. Once the pin 16 has engaged the catch 20, the spring 18 will hold the pin 16 in place, which will prevent the gate 14 to be twisted to "unthread" it from crossing the gate "G."

SUMMARY OF THE INVENTION

In light of the aforementioned problems associated with the prior devices, it is an object of the present invention to provide a Irreversibly Locking Clip. The clip should have a hinged latch that pivots from an open position to a closed position, similar to a conventional caribiner. The clip should provide structural strength and durability of a caribiner or shackle. The clip should include one or more spring-loaded pins that will irreversibly lock the latch in a closed position by extending into a corresponding socket when the latch is closed. Additionally, the clip should incorporate a retaining tip at the tip end of the latch that engages a tip retaining socket when the latch is closed in order to provide additional reinforcement between the latch and the body of the clip.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

FIG. 3 is a side view of a preferred embodiment of the Irreversibly Locking Clip of the present invention;

FIG. 5 is a partial front view of the Clip of FIGS. 3 and 4;

FIGS. 6A and 6B are partial side views of the body of the Clip of FIGS. 3 and 4;

FIGS. 7A and 7B are perspective views of the latch member of the Clip of FIGS. 3 and 4;

DETAILED DESCRIPTION OF THE PREFERRED EMBODIMENTS

Figure 2:
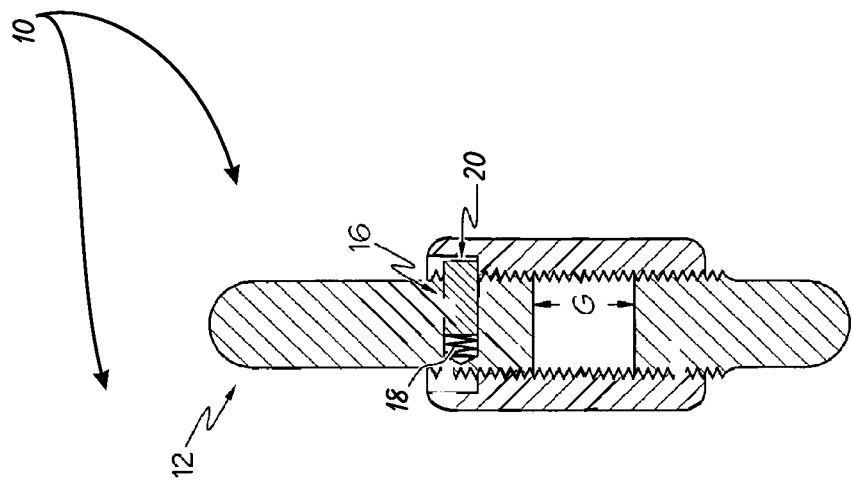
FIG. 2 is a cutaway front view of the Mechanism of FIG. 1.
Figure 1:
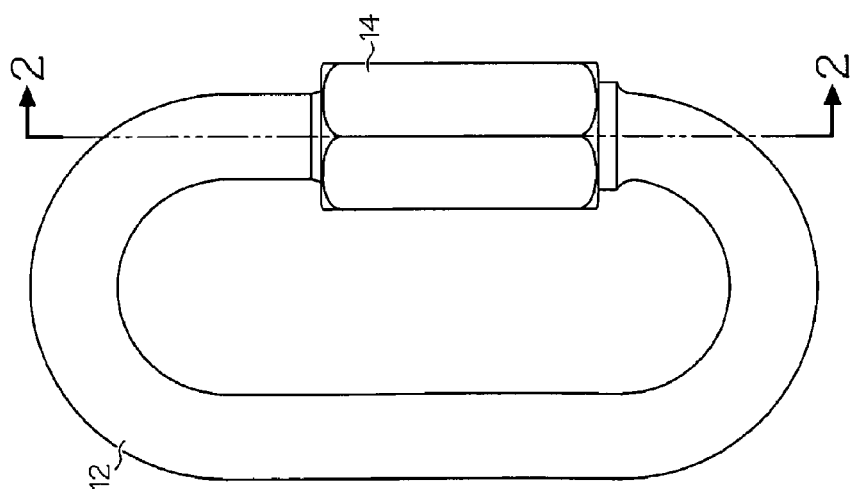
FIG. 1 is a side view of the Irreversible Locking Mechanism of US Patent Publication No. 2010/0011547.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Irreversibly Locking Clip.

The present invention can best be understood by initial consideration of FIG. 3.[1] FIG. 3 is a side view of a preferred embodiment of the Irreversibly Locking Clip 30 of the present invention. The clip 30 comprises an oval-shaped body 32 in this version, but could be also provided in other shapes, such as the more triangular shape of a caribiner, or even a circular ring shape.

[1] As used throughout this disclosure, element numbers enclosed in square brackets [ ] indicates that the referenced element is not shown in the instant drawing figure, but rather is displayed elsewhere in another drawing figure.

There is an opening 36 in the body 32 that is defined by a hinge end 38 and an open end 40. The opening 36 is bridged by latch member 34. In this FIG. 3, the latch member 34 is depicted in solid lines in its closed and latched position, and in broken lines in an open/unlatched position. The latch member 34 pivots about hinge pin 39. In this version, the latch member 34 pivots outward in order to clear the opening 36. In other versions, the latch member 34 may depress into the center area of the body 32, similar to a conventional caribiner.

Unlike the mechanism [10] of Schluep, the instant clip 30 is designed to be much quicker to install and lock, since the structure does not require the user to twist a threaded sleeve or gate in order to close the opening 36 in the link/clip. The locking clip 30 operates much like a conventional "caribiner," and employs a hinged jaw or latch that can be either spring-loaded (to either bias towards closed or bias towards open), or it can be non-spring-loaded (as shown in FIG. 3). If we now turn to FIG. 4, we can examine the improvements of this invention in more detail.

Figure 4:
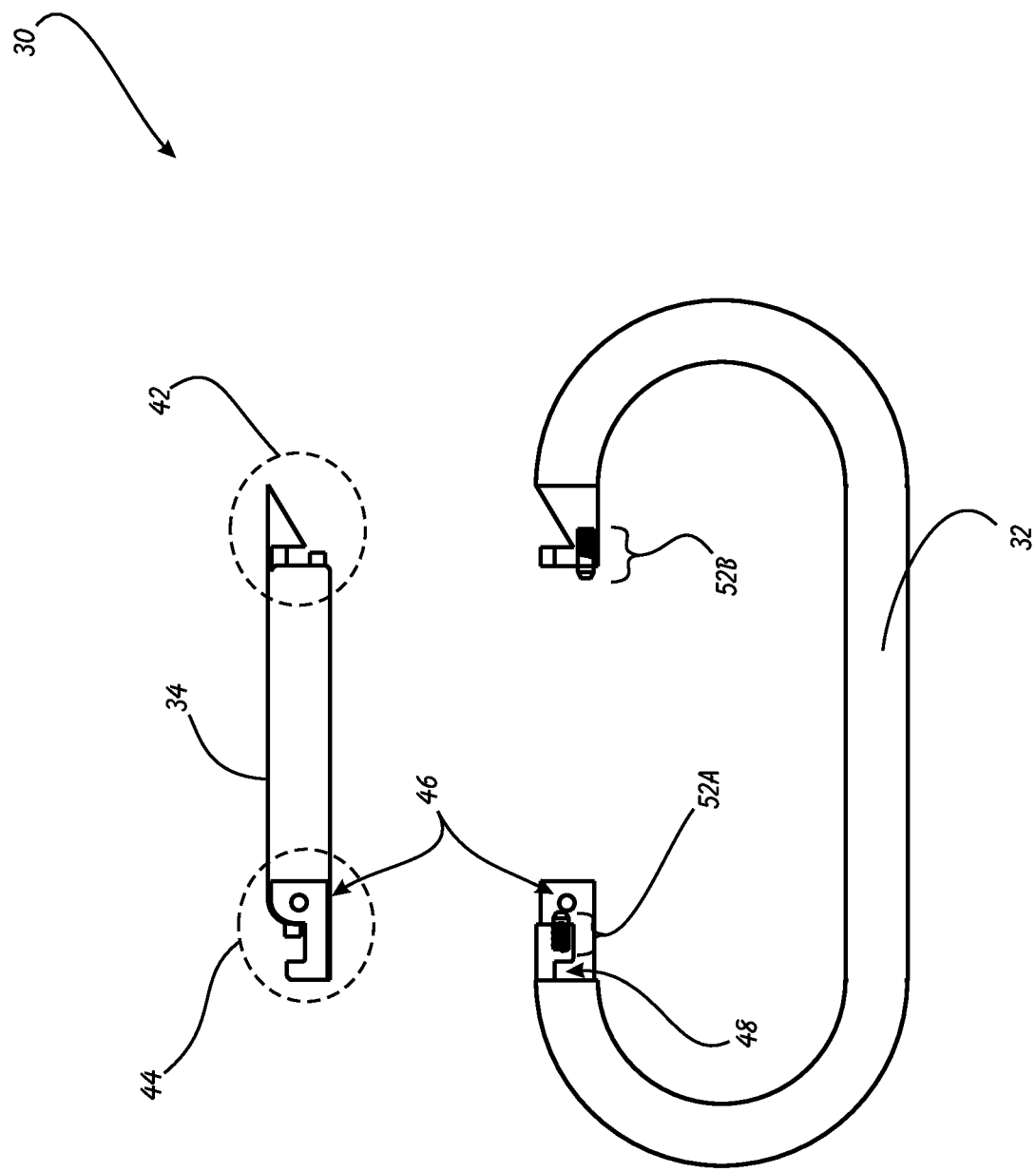
FIG. 4 is a partially exploded side view of the Clip of FIG. 3.

FIG. 4 is a partially exploded side view of the Clip 30 of FIG. 3. The mechanisms that cause the latch member 34 to remain locked in the closed position are the spring-loaded pin assemblies 52A and 52B. As will be discussed further below, these pin assemblies 52A, 52B protrude into recesses formed in the latch member 34 when the latch member 34 is closed, so that the latch member 34 is irreversibly locked in the closed position.

The latch pin 34 pivots around a hinge pin [39] that is inserted through the hinge bores 46 formed in the body 32 and latch member 34. There are two optional features shown here that are included in this version in order to improve the strength and durability of the clip 30. There is a retaining tip 42 formed at the tip end of the latch member 34. This tip 42 engages a tip retaining socket 50 formed in the open end [40] of the body 32. The tip 42 and socket 50 are cooperatively designed so that they effectively grasp one another to prevent the tip 42 from pulling away from the socket 50. Similarly, there is a retaining finger 44 formed on the hinge end of the latch member 34 and a corresponding retaining finger socket 48 formed within the hinge end [38] of the body 32. When the latch member 34 closes, the retaining finger 44 inserts into and engages the finger socket 48, so that the engagement between the finger 44 and socket 48 will absorb some of the longitudinal force on the hinge pin [39] in order to prevent damage to the pin [39] by the latch member 34 being pulled away from the hinge end [38] of the body. One or more of these features could be eliminated from the clip 30, depending upon the particular application and strength requirements for the clip 30. Turning to FIGS. 5, 6A and 6B we can examine the locking pins in additional detail.

FIG. 5 is a partial front view of the Clip 30 of FIGS. 3 and 4. FIGS. 6A and 6B are partial side views of the hinge end [38] and open end [40] of the body 32. In FIG. 5, the latch member 34 is in the closed position (spanning the opening [36] to complete the link). A first pin socket 56A is shown in broken lines as a recessed portion formed in the center portion 53 at the hinge end of the latch member 34. Similarly, a second pin socket 56B (also in broken lines) is formed in the tip end of the latch member 34.

First pin 58A protrudes from the center portion of the hinge end of the body 32. An internal spring (not shown) biases the first pin 58A outward (i.e. towards the latch member 34 when the clip 30 is assembled. As such, when the latch member 34 is rotated about the hinge pin 39 until the first pin socket 56A is aligned with the first pin 58A, the pin 58A will extend into the pin socket 56A and be held there by the internal spring (not shown).

Second pin 58B protrudes from the center portion of the open end of the body 32. A second spring (not shown) biases the second pin 58B outward from the body 32 and towards the tip end of the latch member 34. The second pin 58B will be driven into the second pin socket 56B when the latch member 34 is rotated into the closed position (i.e. to span the opening [36]), and the pin socket 56B is aligned with the pin 58B. This also locks the latch member 34 in place and prevents the latch 34 from being opened up again.

FIGS. 7A and 7B depict these features in three dimensions in order to clarify the relationship between the elements— they are perspective views of the latch member 34 of the Clip 30 of FIGS. 3 and 4. The latch member 34 is defined by a central stem portion 60 from which a neck portion 62 extends and terminates in a wedge-shaped retaining tip 42. There is a gap 66 between the face 55 of the stem portion 60 (at the tip end) and the wedge-shaped tip portion 64. The second pin socket 56B is formed in the face 55 of the stem portion 60, as can be clearly seen in FIG. 7B.

Similarly, the first pin socket 56A is formed in the face 57 of the center portion 53 extending towards the hinge end of the latch member 34 from the stem portion 60. The retaining finger 44 is in spaced relation to the face 57 in order to grasp the retaining finger 44 when the latch member 34 is in its closed position. Finally, turning to FIGS. 8A and 8B, we can examine the features of the body that cooperate with these locking features of the latch member 34.

Figures 8A, 8B:
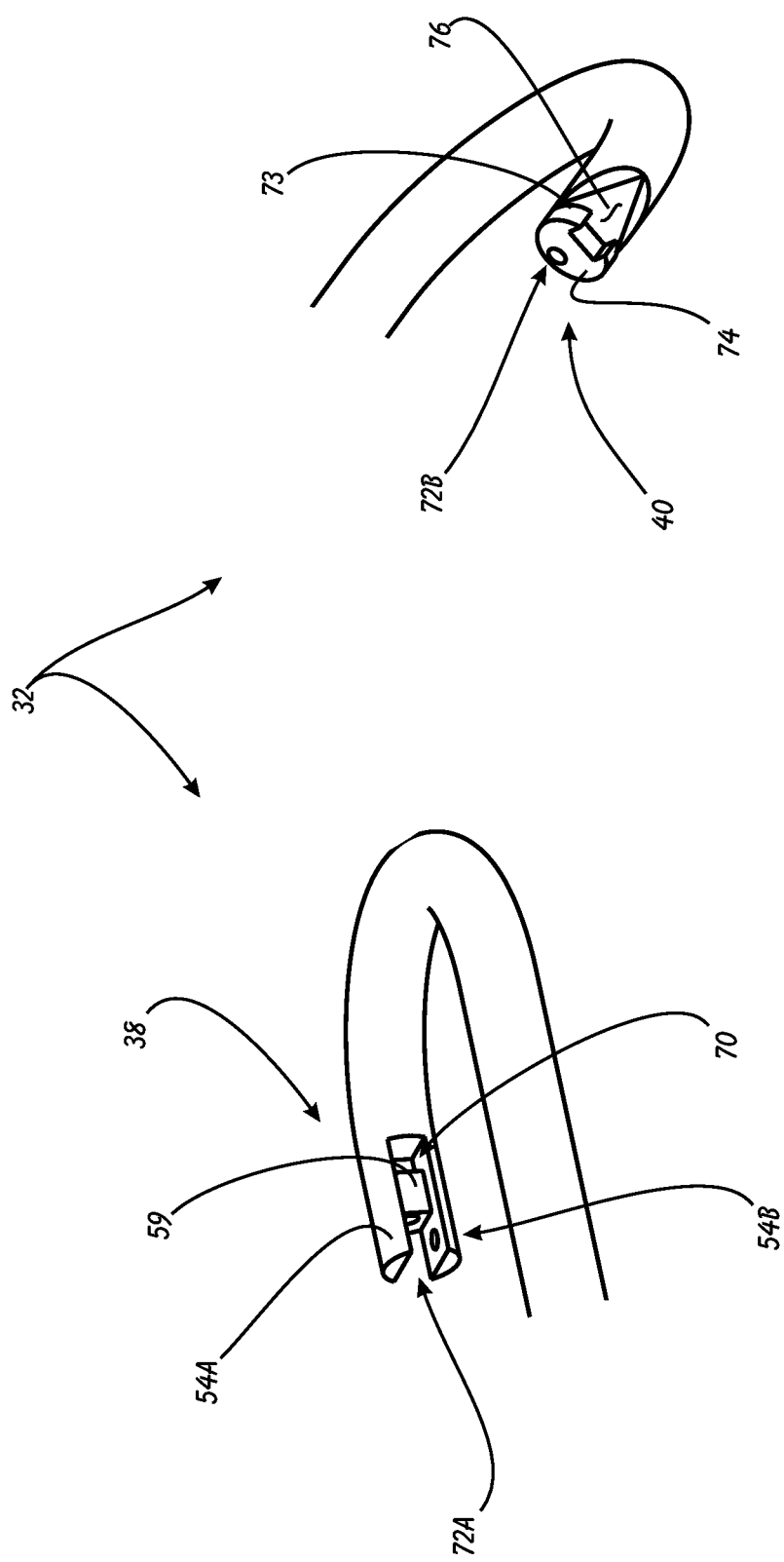
FIGS. 8A and 8B are partial perspective views of the body of the Clip of FIGS. 3 and 4.

FIGS. 8A and 8B are partial perspective views of the body of the Clip 30 of FIGS. 3 and 4. The first spring pin assembly socket 72A is a bore formed in the center portion 59 of the hinge end 38 of the body 32. The retaining finger socket 70 is located and configured so that as the latch member [34] rotates from the open position to the closed position, the retaining finger [44] will approach and then insert into the retaining finger socket 70. The finger [44] will then be held in the socket 70 to provide additional strength to the clip 30.

At the open end of the body 32, the tip retaining socket 76 is a wedge-shaped recess formed in the body 32 that terminates in collar 73. When the latch member [34] closes (i.e. rotating around the hinge pin [39]), the retaining tip [42] will approach and then insert into the tip retaining socket 76, and will thereafter provide additional strength to the clip by being restrained by the collar 73.

The collar 73 is defined by a face 74, and further has a notch formed in it to accept the neck portion [62] into it. The second spring pin assembly socket 72B is formed in the face 74 so that it aligns with the first pin [58A] when the latch member [34] reaches the closed position.

The instant version of the Clip 30 includes a pair of pins 58A, 58B (one at each end of the latch member 34). In other versions, only a single pin may be employed to lock the latch member 34 in a closed position. The reduction to a single pin would be expected to reduce overall cost of the Clip 30, while still being suitable for applications where dual redundancy in the locking mechanism (for the latch member 34) is not necessary.

Figure 9:
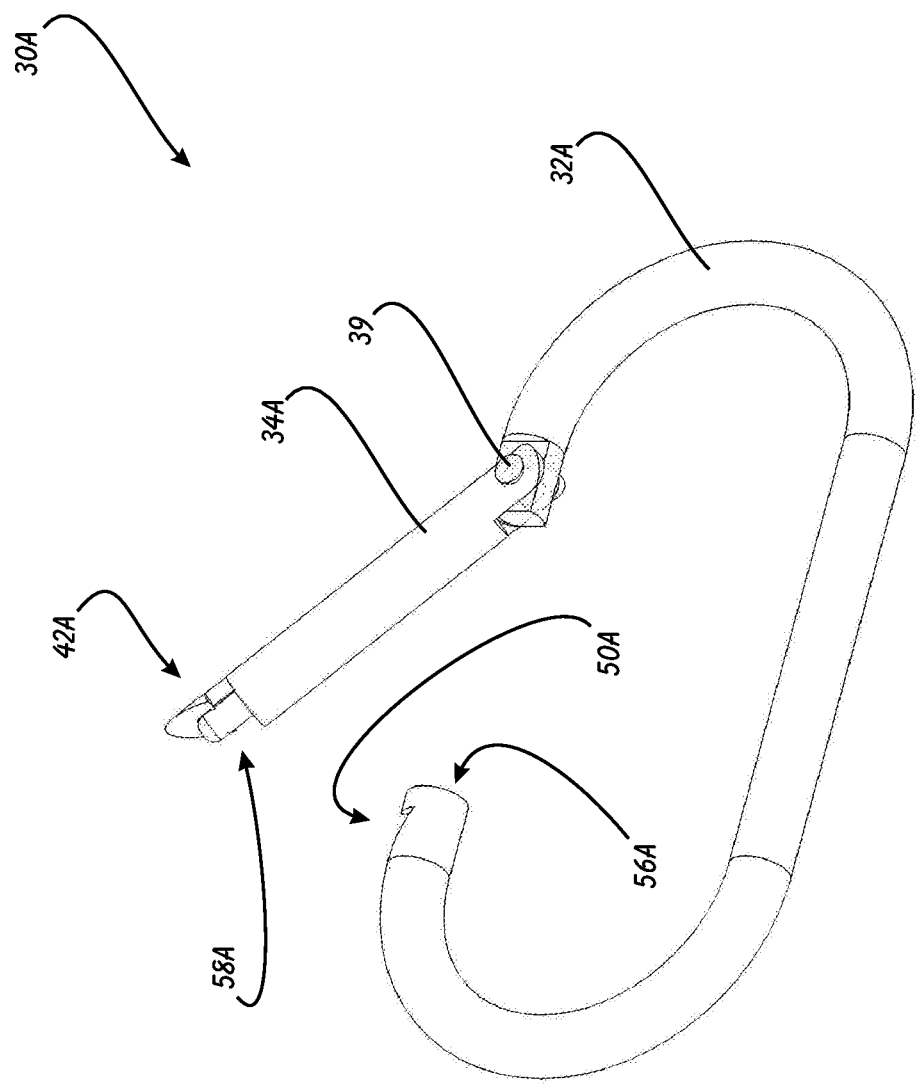
FIG. 9 is a perspective view of a second embodiment of the Irreversibly Locking Clip of the present invention.
Figure 10:
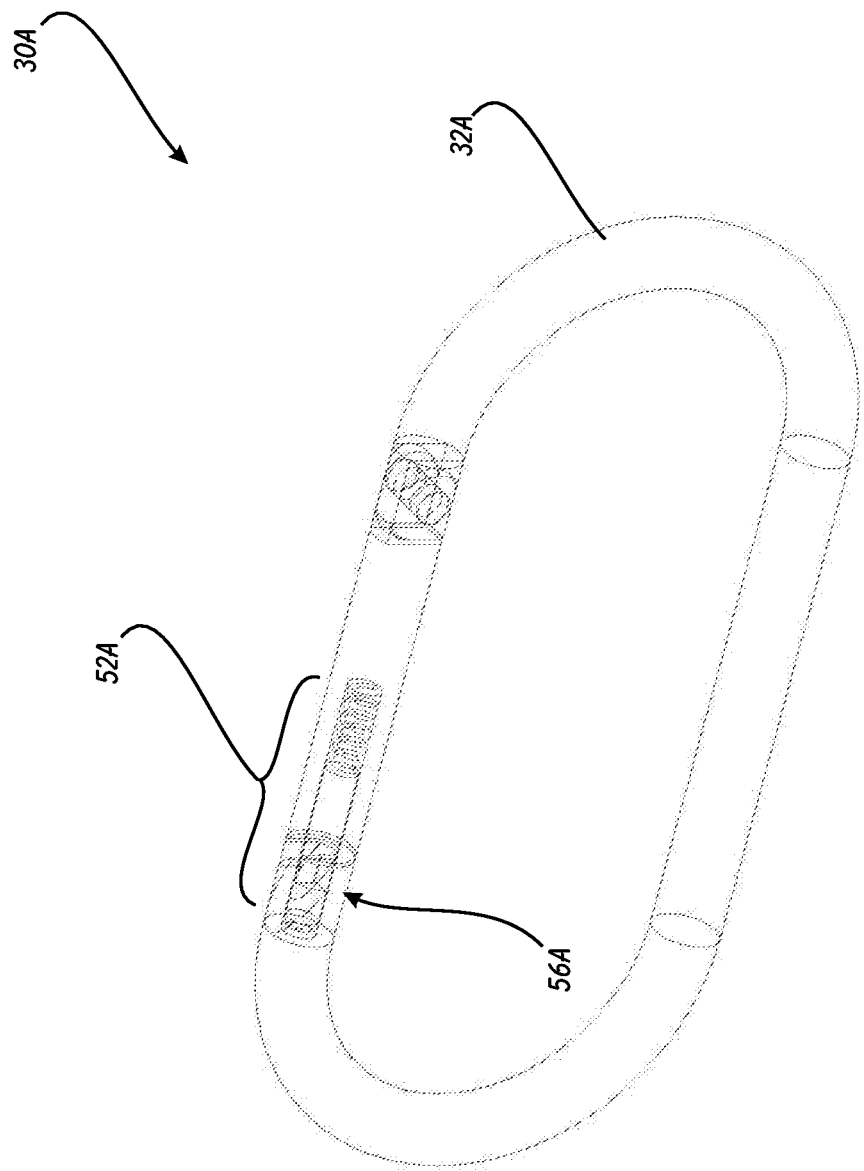
FIG. 10 is the view of FIG. 9 showing internal components in hidden lines.

FIGS. 9 and 10 are perspective views of a second embodiment of the Irreversibly Locking Clip 30A of the present invention. The design shown here is expected to be simpler in operation and manufacture, while still providing the same benefits as the clip [30] discussed above.

In this version, the hinged end of the latch member 34A does not include the retaining finger [44] of the embodiment of FIGS. 3-8. There is a first spring-loaded pin assembly 52A at the openable (distal) end of the latch member 34A. This pin assembly 52A comprises a spring element that biases the first pin 58A towards the first pin socket 56A (once the latch member 34A has been closed and the retaining tip 42A has engaged the tip retaining socket 50A). As with the design of the first embodiment [30], once the pin 58A has engaged the pin socket 56A, the latch member 34A will be prevented from re-opening without destroying the mechanism.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:
1. A securing device, comprising:
    a body terminating in first and second ends, said second end defined by a pin socket formed therein; and
    a latch member configured to interconnect said first and second ends, said latch member hingably attached to said first end, said latch member further comprising a pin extending from an opposing end, said pin configured to insert into said pin socket when said opposing end of said latch member is aligned with said second end, wherein said latch member further comprises a biasing element biasing said pin to extend from said opposing end.

2. The device of claim 1, wherein said biasing element is configured to prevent said pin from retracting from said pin socket once said latch member opposing end has been aligned with said second end and said pin has extended into said pin socket.

3. The device of claim 2, wherein said second end of said body further comprises a tip retaining socket formed therein and said latch member opposing end comprises a retaining tip extending therefrom; and
   whereby said retaining tip engages said tip retaining socket when said opposing end has been aligned with said second end, thereafter resisting disengagement therefrom due to tensile forces applied axially along said latch member.

4. The device of claim 2, wherein said second end of said body further comprises a tip retaining socket formed therein and said latch member opposing end comprises a retaining tip extending therefrom; and
   whereby said retaining tip engages said tip retaining socket when said opposing end has been aligned with said second end, thereafter resisting disengagement of said retaining tip from tip retaining socket is force is applied to said first and second ends in a fashion to pull said first and second ends away from one another.

5. The device of claim 1, wherein said body comprises an elongate bar formed in the shape of a circle with said first and second ends defined by a gap therebetween and said latch member is configured to fill said gap when said latch member opposing end is aligned with said body second end.

6. The device of claim 1, wherein said body comprises an elongate bar formed in the shape of an oval with said first and second ends defined by a gap therebetween and said latch member is configured to fill said gap when said latch member opposing end is aligned with said body second end.

7. A clip, comprising:
   a body defined by a pair of opposing first and second ends in axial alignment and in relative spaced relation to one another, said second end comprising a tip retaining socket formed therein, said second end of said body further comprising a pin extending therefrom;
   a latch member configured to interconnect said first and second ends, said latch member hingably attached to said first end, said latch member further comprising a retaining tip extending from an opposing end, said retaining tip configured to cooperate with said tip retaining socket to be accepted therein when said opposing end is aligned with said body second end;
   said opposing end of said latch member further comprising a pin socket formed therein;
   whereby said pin extends into said pin socket when said opposing end is aligned with said second end;
   wherein a tab extending from said retaining tip engages a ridge formed in said tip retaining socket when said retaining tip is accepted within said tip retaining socket, and said engagement of said tab and said ridge resists said first and second ends of said body from being pulled away from one another; and
   further comprising a biasing element biasing said pin to extend from said second end and to remain inserted into said pin socket when said opposing end is aligned with said second end.

8. The clip of claim 7, wherein said body comprises an elongate bar formed in the shape of an oval with said first and second ends defined by a gap therebetween and said latch member is configured to fill said gap when said latch member opposing end is aligned with said body second end.

9. The clip of claim 7, wherein:
   said first end of said body further comprises pin socket formed therein;
   said first end of said latch member further comprises a pin extending therefrom; and
   whereby said pin extends into said pin socket when said latch member first end is hingably rotated until it is aligned with said body first end.

10. The clip of claim 9, further comprising a biasing element biasing said pin to extend from said opposing end and to remain inserted into said pin socket when said opposing end is aligned with said second end.

11. The clip of claim 10, wherein said body comprises an elongate bar formed in the shape of an oval with said first and second ends defined by a gap therebetween and said latch member is configured to fill said gap when said latch member opposing end is aligned with said body second end.

12. A clip, comprising:
   a body defined by an elongate element defining an oval shape and terminating in a pair of opposing first and second ends in axial alignment and in relative spaced relation to one another, said second end comprising a pin socket formed therein; and
   a latch member defined by a hinge end and a free end, said hinge end pivotally attached to said body first end and further defined by a spring-loaded pin biased by said spring to extend from said free end, whereby said pin is configured to lock said free end to said second end of said body when said free end is aligned with said second end and said pin extends into said pin socket.

13. The clip of claim 12, wherein:
   said second end of said body further comprises pin socket formed therein;
   said opposing end of said latch member further comprises a pin extending therefrom; and
   whereby said pin extends into said pin socket when said opposing end is aligned with said second end.

14. The clip of claim 13, wherein said second end of said body further comprises a tip retaining socket formed therein and said latch member opposing end comprises a retaining tip extending therefrom; and
   whereby said retaining tip engages said tip retaining socket when said opposing end has been aligned with said second end, thereafter resisting disengagement of said retaining tip from tip retaining socket is force is applied to said first and second ends in a fashion to pull said first and second ends away from one another.

15. The clip of claim 13, wherein said opposing end of said latch member further comprises a tip retaining socket formed therein and said body second end comprises a retaining tip extending therefrom; and
   whereby said retaining tip engages said tip retaining socket when said opposing end has been aligned with said second end, thereafter resisting disengagement of said retaining tip from tip retaining socket is force is applied to said first and second ends in a fashion to pull said first and second ends away from one another.

\* \* \* \* \*